N. W. CLARK.
Evaporating Pan.
No. { 368, 31,372 }
Patented Feb. 12, 1861.
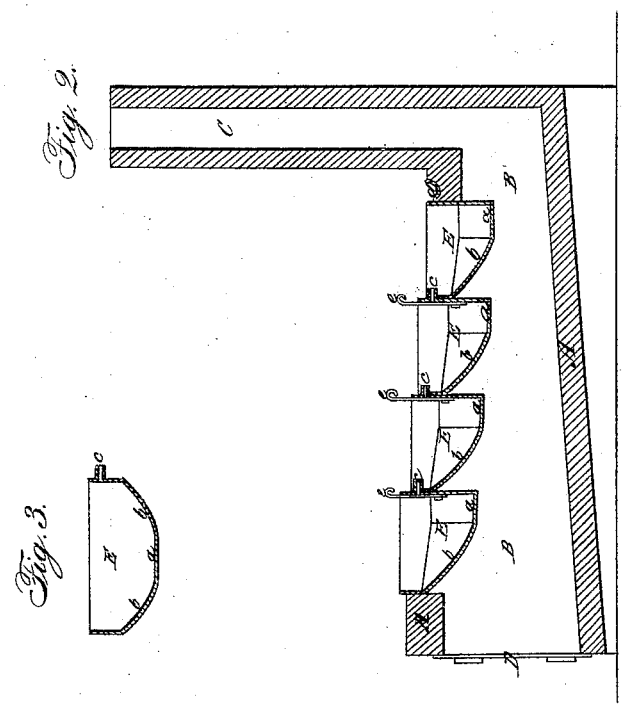
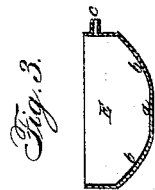
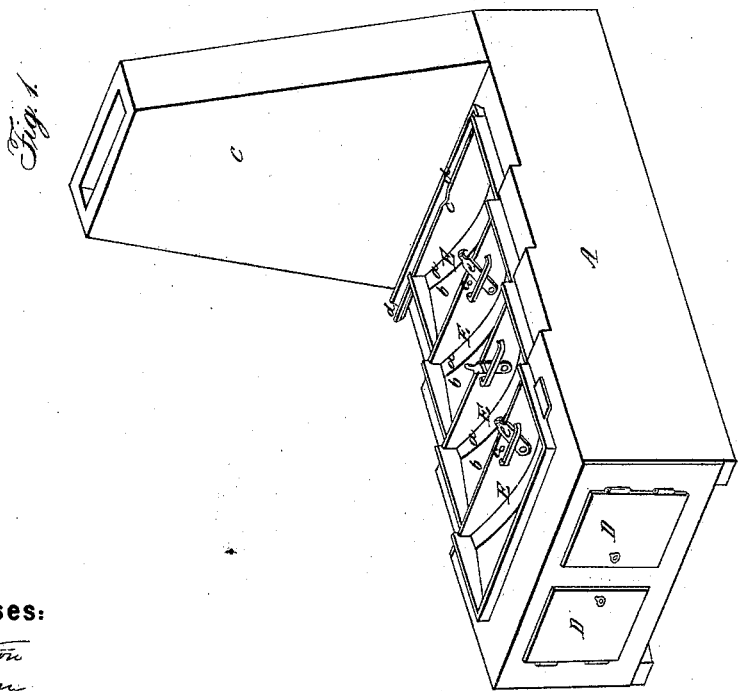
Witnesses:
Inventor:

UNITED STATES PATENT OFFICE.

NELSON W. CLARK, OF CLARKSTON, MICHIGAN.

IMPROVEMENT IN MANUFACTURE OF SALT.

Specification forming part of Letters Patent No. 31,372, dated February 12, 1861.

*To all whom it may concern:*

Be it known that I, NELSON W. CLARK, of Clarkston, in the county of Oakland and State of Michigan, have invented a new and useful Process in the Manufacture of Salt; and I do hereby declare the following to be a full, clear, and exact description of the same, reference being had to the accompanying drawings, making a part of this specification, and which represent an apparatus by which this process may be carried out.

Figure 1 represents in perspective view of a "salt-block," or series of pans or kettles set in a furnace. Fig. 2 represents a longitudinal vertical section through the same, and Fig. 3 represents a cross-section through a modified form of pan which will be hereinafter referred to.

Similar letters of reference, where they occur in the separate figures, denote like parts of the apparatus in all the drawings.

My invention has for its object the making of salt-boiling a continuous operation, instead of stopping the boiling for precipitating or crystallization of the salt or cleaning or scaling the pans or kettles; and I found my process upon the basis that the impurities contained in the salt-water are held longer in solution and require a greater degree of heat to cause them to precipitate or crystallize than the salt does, and that hence I can constantly flow off these impurities while held in suspension or solution in the water, while the salt will deposit and remain behind, and thus make the process a continuous one. To accomplish this constant flow off of the water containing the impurities, it is obvious that it must be done at the top or near the top of the pan or kettle, and that the series of pans or kettles must be so arranged as that the water from the first will flow off into the second one, the second into the third, and so on to the end of the series, where a trough or tube receives the excess and carries it off.

I am aware that a series of kettles have been so arranged as that one will drain into the next adjacent one, but from their bottom portions, and this carries off the salt, instead of leaving it behind and carrying off the impurities held in the water. Such process, too, requires a stoppage to collect, drain off, precipitate, or crystallize the salt, and while this is being done the communication between the kettles must be cut off. By my arrangement and process I am not compelled to stop the salt-deposits in each kettle or pan while the impurities flow off at the top. The salt, as it precipitates in the pans, is scooped out and put upon the draining table or stand, and as it precipitates in the water it never adheres to the pan, and of course saves the labor and delay of scaling the pans, which must be done quite often by the old process.

My process and my invention consist in precipitating the salt by the aid of artificial heat, and leaving it behind in the pans or series of pans, while the water holding all the other mineral impurities usually found in saline water is constantly flowing through the series of pans, and escaped or carried off at the end of the series, thus making the process continuous.

To enable others skilled in the art to make and use this process, I will proceed to describe an apparatus by which it may be advantageously carried out.

A represents walls of brick, stone, or earth containing within them a fire-chamber, B, at the end of which there is a stack, C. D are the doors for feeding the fuel into.

E E, &c., represent a series of pans set over the fire-chamber B. These pans have a portion of them, as at *a*, of a section of a cylinder form, while the other portion, *b*, in form represents a section of an ellipse or parabola, the object of the two forms being to get as much fire-surface as possible on their under sides, to allow the salt that precipitates to run toward a special point, and to admit of the salt being readily scooped up when it is to be removed. At or near the top of each pan in the series there is a lip, pipe, or other conductor, *c*, that carries off the excess of saline or other water from itself to the next pan in the series, and these pans are set lower as they recede from the head of the block, for the purpose of causing this continuous flow through them. From the last pan of the series the liquid, which has given up all its salt, but still holds in solution or suspension the other impure minerals, passes into a spout or trough, *d*, and is carried off to any proper place of deposit. Each of the flow-off pipes or lips *c* is furnished with a stop or cut-off, *e*, so that the flow may be properly adjusted at all times, and regulated to conform to the supply furnished to the first one from the boiler, where it is usually first boiled under pressure before it is let into the pans. It may not be necessary simply for this purpose that each pan should be furnished with a cut-off; but other circumstances may happen to render one at each pan desirable, as a brief stoppage may sometimes be necessary, and I do not desire to expose my invention to evasion by restricting myself to constant flow through the pans, when a temporary stoppage may be resorted to, not for any beneficial purpose, but simply to evade the gist of the invention.

The process is as follows: The salt-water is first boiled in a vat, boiler, or any other vessel, and usually under pressure. This is the common practice, and is no part of my invention. From this boiler the saline water is allowed to flow continuously in a small stream into the first pan or kettle of the series, where it is also boiled by the fires below, the excess of water flowing off at the surface into the next adjacent pan or kettle, and so on throughout the series, until at the end of the block the excess of water holding the impurities flows off into a spout, trough, or conductor, and carried off. The salt is crystallized, and precipitates in each one of the pans or kettles so long as any remains in the water, and the salt is dipped or scooped up from the bottom of each pan or kettle as fast as it accumulates in any appreciable quantity, and is laid upon the draining boards or table, and thus the process may be carried on continuously. The quantity of water let on and flowing through the pans and kettles is regulated according to the density of the fires under them, and to the condition of the water and its readiness to give up its salt, while it will hold on to the other mineral impurities that are found in saline waters.

In Fig. 3 I have represented a section through a pan or kettle, in which the center is a section of a cylinder, and each side of it a section of an ellipse or parabola. This form allows the salt that settles upon the part $a$ to be readily scooped up and removed.

Having thus fully described the nature and object of my invention, what I claim as new, and desire to secure by Letters Patent, is—

The process herein described of separating and precipitating the salt contained in saline waters by the aid of artificial heat, while the water is continuously flowing through the series of pans or kettles at the surface of each, and carrying off the impurities still held in solution or suspension at the end of the series of pans, substantially as described.

N. W. CLARK.

Witnesses:
   A. B. STOUGHTON,
   E. COHEN.